United States Patent
Yuasa (10) Patent No.: US 8,090,151 B2
(45) Date of Patent: Jan. 3, 2012

(54) FACE FEATURE POINT DETECTION APPARATUS AND METHOD OF THE SAME

(75) Inventor: Mayumi Yuasa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1063 days.

(21) Appl. No.: 11/950,261

(22) Filed: Dec. 4, 2007

(65) Prior Publication Data

US 2008/0304699 A1    Dec. 11, 2008

(30) Foreign Application Priority Data

Dec. 8, 2006  (JP) ................................ 2006-332422

(51) Int. Cl.
*G06K 9/00* (2006.01)

(52) U.S. Cl. ...................................... 382/104; 382/117

(58) Field of Classification Search .................. 382/104, 382/118
See application file for complete search history.

(56) References Cited

U.S. PATENT DOCUMENTS

| | | | | |
|---|---|---|---|---|
| 5,982,912 A * | 11/1999 | Fukui et al. | .................... | 382/118 |
| 6,111,580 A * | 8/2000 | Kazama et al. | ............... | 715/863 |
| 6,181,805 B1 * | 1/2001 | Koike et al. | .................... | 382/118 |
| 7,065,230 B2 * | 6/2006 | Yuasa et al. | .................... | 382/104 |
| 7,120,278 B2 * | 10/2006 | Sukegawa et al. | ............ | 382/118 |
| 7,346,192 B2 * | 3/2008 | Yuasa et al. | .................... | 382/104 |
| 2001/0040985 A1 * | 11/2001 | Okano et al. | .................. | 382/117 |
| 2007/0071289 A1 | 3/2007 | Takeguchi et al. | | |
| 2007/0183665 A1 | 8/2007 | Yuasa et al. | | |
| 2007/0201729 A1 | 8/2007 | Yuasa et al. | | |

FOREIGN PATENT DOCUMENTS

| | | |
|---|---|---|
| JP | 09-251534 | 9/1997 |
| JP | 2000-311248 | 11/2000 |
| JP | 2003-281539 | 10/2003 |
| JP | 2006-228061 | 8/2006 |

OTHER PUBLICATIONS

Japanese Office Action for Japanese Patent Application No. 2006-332422 Mailed on Feb. 8, 2011.

* cited by examiner

*Primary Examiner* — Hadi Akhavannik (74) *Attorney, Agent, or Firm* — Turocy & Watson, LLP (57) ABSTRACT

An image input unit configured to enter a face image, a search area and scale setting unit configured to set a search area and a scale, an image feature point detection unit configured to detect image feature points selected from local image information of respective points, a first dictionary storing coordinates of the relative position between the image feature points and a target feature point in association with peripheral patterns of the image feature points, a first pattern matching unit configured to match the first dictionary and the peripheral patterns of the image feature points, a target feature point candidate position estimating unit configured to estimate candidates of the position of the target feature point, a second dictionary, a second pattern matching unit configured to match the second dictionary and a peripheral pattern of the target feature point and a determination unit configured to obtain the position of the target feature point.

7 Claims, 6 Drawing Sheets

FACE FEATURE POINT DETECTION APPARATUS AND METHOD OF THE SAME

CROSS-REFERENCE TO RELATED APPLICATIONS

This application is based upon and claims the benefit of priority from the prior Japanese Patent Application No. 2006-332422 filed on Dec. 8, 2007; the entire contents of which are incorporated herein by reference.

TECHNICAL FIELD

The present invention relates to a face feature point detection apparatus and a method of the same and, more specifically, to a face feature point detection apparatus which is able to detect also parts having less image feature such as the tip of the nose and a method of the same.

BACKGROUND OF THE INVENTION

The face feature point detection apparatus in the related art includes the one which detects candidates of a face feature point with a circular separability filter and verifies these candidates using an image pattern as disclosed in Japanese Patent No. 3279913. However, satisfactory detection of the face feature point is not achieved in a case in which the face feature point has less image feature and hence candidates of the feature point are not detected absolutely in the vicinity thereof.

There is also a face feature point detection apparatus which applies template matching on an image in the periphery of the feature point as disclosed in Japanese Application Kokai 11-203456. However, when the feature point has less image feature, the pattern is not specific for the feature point, and hence satisfactory detection is not achieved due to the existence of similar images at different positions.

As described above, the related art has a problem such that satisfactory detection is not achieved in the case in which the face feature point has less image feature and hence candidates of the feature point are not detected absolutely in the vicinity thereof.

The simple template matching has a problem such that the pattern is not specific for the feature point in the case in which the feature point has less image feature, and hence satisfactory detection is not achieved due to the existence of similar images at different positions.

BRIEF SUMMARY OF THE INVENTION

Accordingly, it is an object of the present invention to provide a face feature point detection apparatus which is able to detect a face feature point even when the face feature point has less image feature and candidates of the feature point are not detected absolutely in the vicinity thereof and a method of the same.

According to embodiments of the present invention, there is provided a face feature point detection apparatus including: an image input unit configured to enter an image including a face; a search area setting unit configured to set a search area for detecting a target feature point from the image; an image feature point detection unit configured to detect image feature points from the search area of the image; a first dictionary storage unit configured to store a first dictionary including information relating to peripheral patterns of learning image feature points obtained from a plurality of learning face images and coordinates of relative positions between the respective learning image feature points and learning target feature points associated with respect to each other; a first pattern matching unit configured to select the peripheral patterns of the learning image feature points which are similar to peripheral patterns of the image feature points from the peripheral patterns of a plurality of the learning image feature points in the first dictionary; a target feature point candidate position estimating unit configured to extract a coordinates of the relative positions of the learning target feature points corresponding to the selected learning image feature points; a target feature point peripheral pattern detection unit configured to crop a peripheral pattern of the target feature point from the face image on the basis of the extracted coordinates of the relative positions; a second dictionary storage unit configured to store a second dictionary including information relating to peripheral patterns of the learning target feature points obtained from the plurality of learning face images; a second pattern matching unit configured to select the peripheral patterns of the learning target feature points similar to the peripheral pattern of the target feature point from the peripheral patterns of the plurality of learning target feature points in the second dictionary; and a determination unit configured to obtain the position of the target feature point from the similarity between the peripheral pattern of the image feature point and the peripheral patterns of the selected learning image feature points and the similarity between the peripheral pattern of the target feature point and the peripheral patterns of the selected learning target feature points.

DETAILED DESCRIPTION OF THE INVENTION

Embodiments of the invention will be described below.

First Embodiment

Referring to FIG. 1 to FIG. 6, a face feature point detection apparatus 10 according to a first embodiment of the invention will be described.

(1) Configuration of Face Feature Point Detection Apparatus 10

Figure 1:
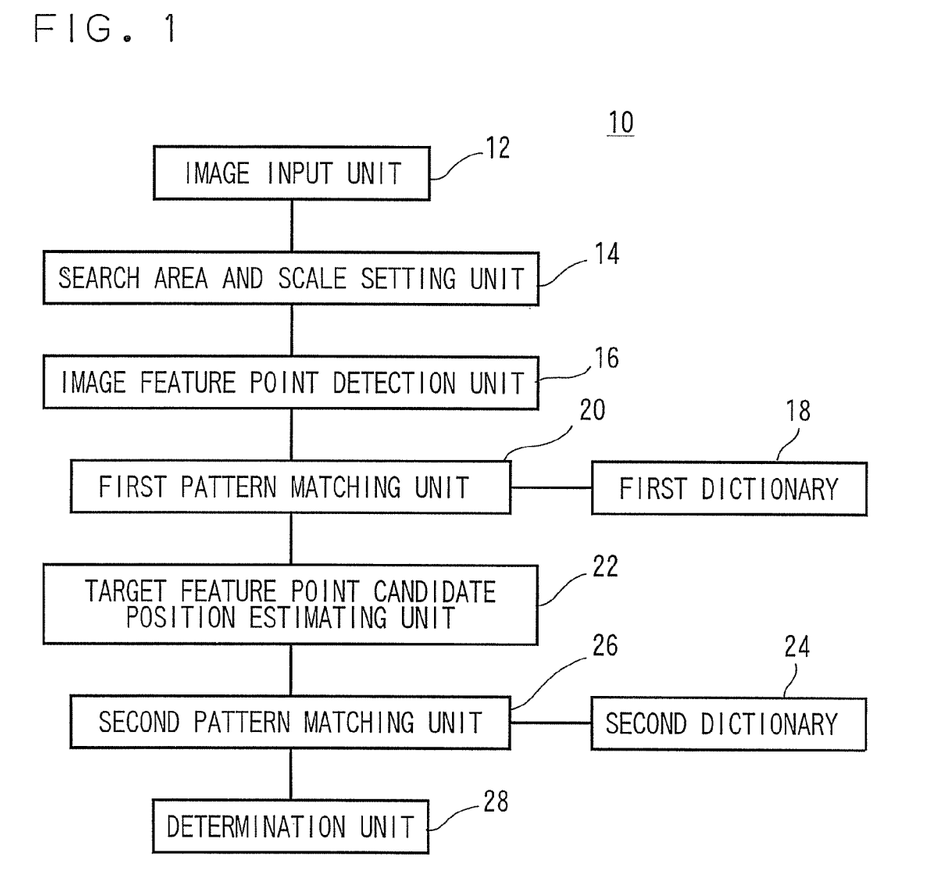
FIG. 1 is a block diagram showing a configuration of a face feature point detection apparatus according to a first embodiment.

FIG. 1 is a block diagram showing the face feature point detection apparatus 10 according to the first embodiment.

The face feature point detection apparatus 10 includes an image input unit 12 for entering an image to be processed, a search area and scale setting unit 14 for setting a search area and a scale, an image feature point detection unit 16 for detecting image feature points selected from local image information of respective points, a first dictionary 18 including coordinates of the relative positions between the image feature points and a target feature point and peripheral patterns of the image feature points stored in association with each other, a first pattern matching unit 20 for matching the first dictionary 18 and the peripheral patterns of the image feature points, a target feature point candidate position estimating unit 22 for estimating candidates of the position of the target feature point, a second dictionary 24, a second pattern matching unit 26 for matching the second dictionary 24 and a peripheral pattern of the target feature point, and a determination unit 28 for obtaining the position of the target feature point.

Functions of the respective units 12 to 28 may also be implemented by a program stored in a computer.

(2) Processing of Face Feature Point Detection Apparatus 10

Figure 2:
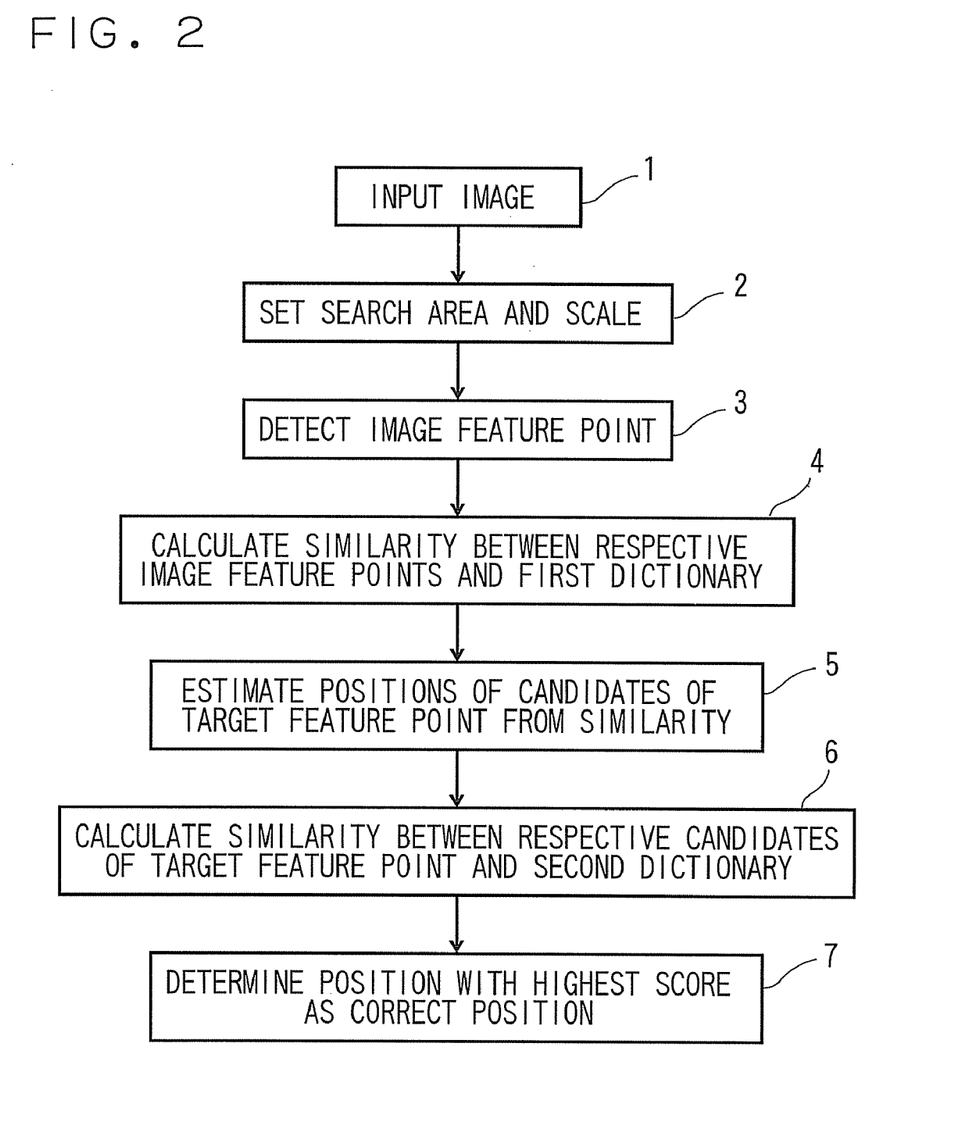
FIG. 2 is a flowchart showing an operation according to the first embodiment.

Referring now to FIG. 1 and FIG. 2, an operation of the face feature point detection apparatus 10 according to the first embodiment will be described. FIG. 2 is a flowchart showing the operation of the face feature point detection apparatus 10 according to the first embodiment.

Figure 3:
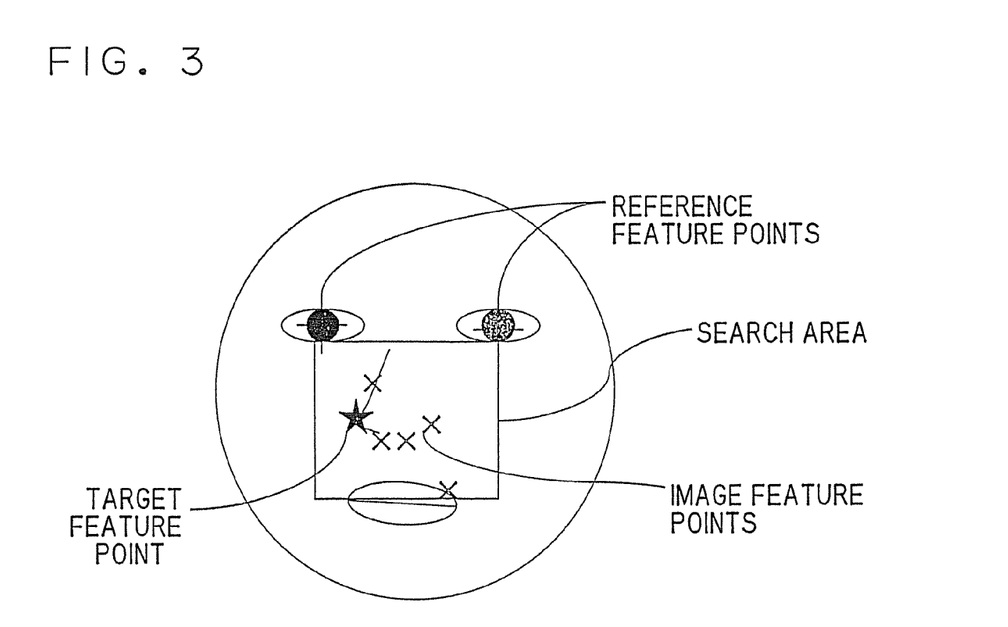
FIG. 3 is an explanatory drawing showing a target feature point (the tip of the nose) according to the first embodiment.

The description shown below is focused on a case of finding the tip of the nose as a target feature point with two points of eyes as reference feature points as shown in FIG. 3 by detecting firstly the reference feature points and setting the search area and the scale using the detected positions of the eyes.

(2-1) Step 1

In Step 1, the image input unit 12 enters an image including a target face.

(2-2) Step 2

Subsequently, in Step 2, the search area and scale setting unit 14 sets the search area and the scale for detecting the target feature point.

In the first embodiment, the two points of the eyes are set as reference feature points as shown in FIG. 3, the reference feature points are detected first, and then the search area and the scale are set using the detected position of the eyes.

The detection of the eyes is achieved by a method including a method of detecting an image feature point with a circular separability filter disclosed in Japanese Patent No. 3279913 and a pattern matching method in combination. The procedure will be described below.

(2-2-1) Image Feature Point Detecting Process

Firstly image feature points are detected from the image described above using the circular separability filter shown in Japanese Patent No. 3279913.

In the first embodiment, the circular separability filter is used as the method of detecting the image feature point. However, other methods are also applicable. For example, a corner detecting method may also be employed.

(2-2-2) Pattern Matching Process

Subsequently, the pattern matching method is performed on the detected image feature points.

Locally normalized images according to the radius of the separability filter are acquired in the vicinity of the respective image feature points, and similarity is calculated between the normalized images and a dictionary prepared from the images of the eyes in advance. Calculation of the similarity is achieved using a subspace method as in Japanese Patent No. 3279913.

The image feature points at which the calculated similarity exceeds a predetermined threshold value are held as candidates of the reference feature point.

Subsequently, a combination of the candidates of the reference feature points which satisfy predetermined positional conditions as left and right eyes is selected. The predetermined positional condition includes the length and the angle of a segment connecting the left and right points.

It is also possible to employ the similarity between images normalized on the basis of these two points and the prepared dictionary as in the case of the locally normalized images to hold the candidates of the reference feature point under the condition that the similarity exceeds the predetermined threshold value.

(2-2-3) Setting of Search Area and Scale

The search area and the scale are set on the basis of the detected two positions of the eyes as the reference feature points.

More specifically, the center of the search area is set to be a position moved from the median point between the left and right eyes vertically by a distance obtained by multiplying the eye distance ed by a predetermined coefficient, and the width and the height of the search area are also set by multiplying the eye distance ed by predetermined coefficients.

The scale is set on the basis of the eye distance ed. In this case, the scale is set by multiplying the eye distance ed by a predetermined coefficient. For example, the coefficient may be 0.1.

(2-3) Step 3

Subsequently, in Step 3, the image feature point detection unit 16 detects the image feature points from local image information of respective points (respective pixels) in the search area. For example, an edge is detected from the brightness values of the respective pixels.

In the first embodiment, the circular separability filter disclosed in Japanese Patent No. 3279913 is used. In this example, the radius of the circular separability filter is determined by the scale set above. As described above, it is obtained by multiplying the eye distance ed by a predetermined coefficient. For example, the coefficient may be 0.1.

(2-4) Step 4

Subsequently, in Step 4, the first pattern matching unit 20 matches the peripheral patterns of the respective image feature points using the first dictionary 18.

(2-4-1) Normalization

Figure 4:
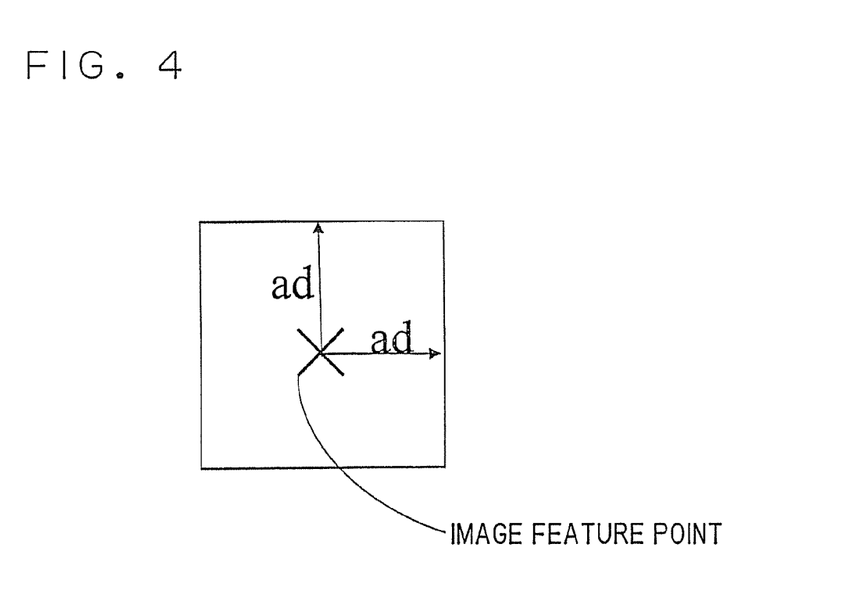
FIG. 4 is an explanatory drawing of normalization of a peripheral pattern of an image feature point according to the first embodiment.

Normalization is performed for the peripheral patterns of the respective image feature points detected in the search area defined as described above. The normalization of the peripheral patterns of the image feature points is achieved by sampling a square area in a range at a distance ad, which is obtained by multiplying ed by a predetermined coefficient, from the image feature point as shown in FIG. 4 and taking the normalized pattern using a scale ed which is set by the feature point setting unit 14.

(2-4-2) Calculation of Similarity

Subsequently, the similarity between the normalized pattern and the first dictionary 18 is calculated. The similarity is calculated using the subspace methods shown in Japanese Patent No. 3279913.

The first dictionary 18 includes a plurality of classes, and each class includes a subspace generated from a peripheral pattern of a learning image feature point which is learned and a relative coordinate with respect to a learning target feature point. At the respective image feature points, the similarity is calculated respectively between the peripheral patterns of the learning image feature points and the subspaces which belong to the respective classes. In this specification, the term "target feature point" means the tip of the nose which is to be obtained as described above. Clustering is applied to the classes in the first dictionary 18 on the basis of the position (coordinate) by dividing the normalized coordinate into a grid like pattern as described later.

(2-5) Step 5

Subsequently, in Step 5, the target feature point candidate position estimating unit 22 uses the similarities for the respective classes (positions) of the first dictionary 18 calculated by the first pattern matching unit 20 to estimate the positions of candidates of the target feature point.

A detailed method of estimation of the position of the target feature point is as follows.

In each class (position) of the first dictionary 18, one subspace and the corresponding relative coordinate are recorded.

When the similarity of each class (position) exceeds a predetermined threshold value, the position of the target feature point is estimated using the corresponding relative position as the candidate of the position of the target feature point.

Figure 5:
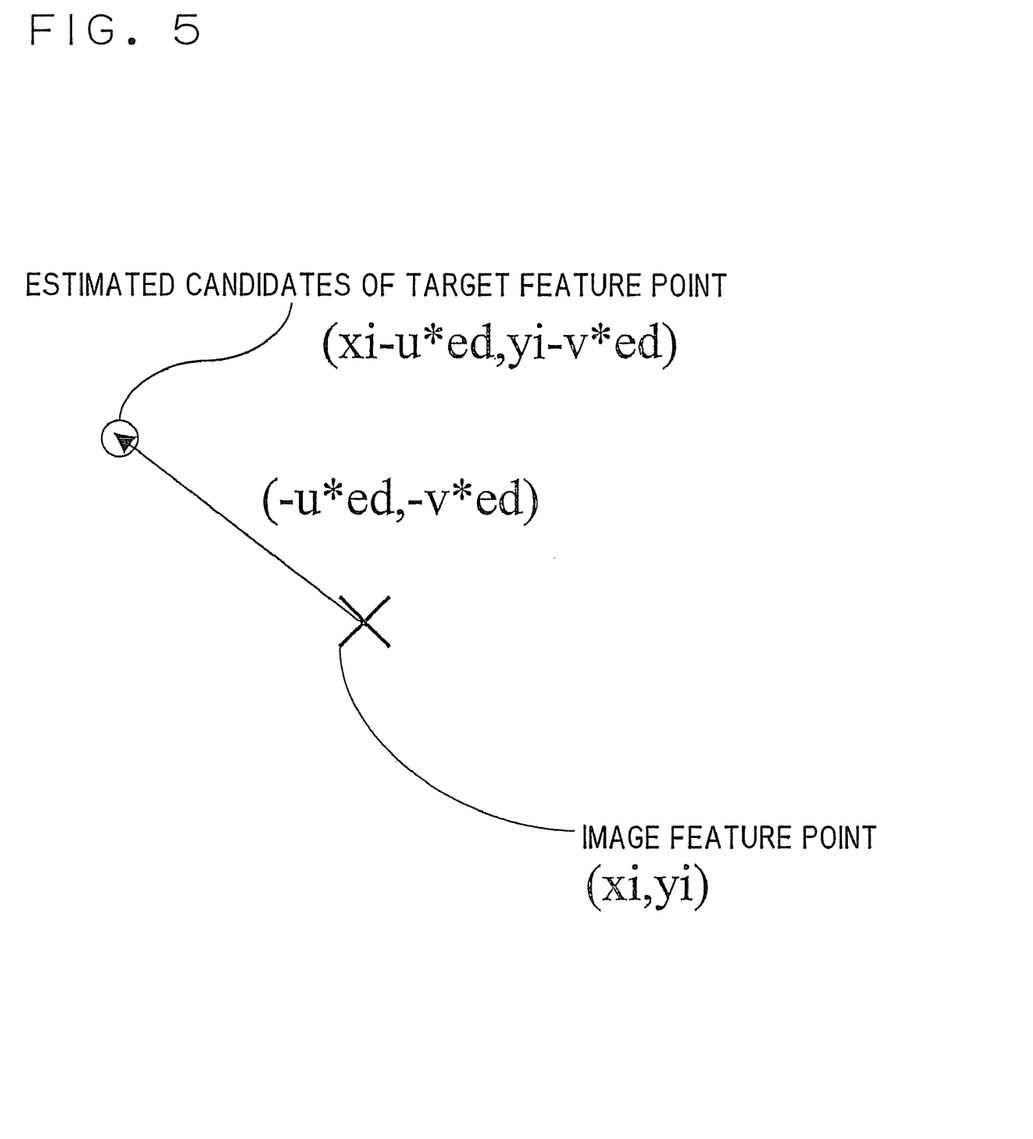
FIG. 5 is an explanatory drawing showing a target feature point candidate estimating method according to the first embodiment.

FIG. 5 illustrates how to estimate the position of the target feature point. Assuming that the coordinate of the position of the $i^{th}$ image feature point is $(xi, yi)$ and the relative coordinate normalized by the eye distance ed is $(u, v)$, the estimated coordinate of the target feature point is obtained as $(xi-u*ed, yi-v*ed)$.

(2-6) Step 6

In Step 6, the second pattern matching unit 26 performs pattern matching of the peripheral patterns of the respective positions of candidates of the target feature point estimated by the target feature point candidate position estimating unit 22. In order to do so, the peripheral patterns are cropped with the estimated coordinates (positions of the candidates) of the target feature point obtained in the procedure shown above as the center.

Subsequently, the peripheral patterns of the position of the candidates of the target feature point are normalized. This normalization is performed in the same manner as in the case of the above-described peripheral patterns of the image feature points.

The similarity between the normalized patterns of the positions of the candidates of the target feature point and the second dictionary 24 is calculated. The subspace method is used calculation of the similarity in the same manner as the first pattern matching unit 20. The second dictionary 24 stores subspaces of the normalized patterns of the learning target feature points, which are associated with the first dictionary 18. In other words, the respective normalized patterns of the respective classes (positions) in the first dictionary 18 and the normalized patterns of the learning target feature points which are cropped from an identical image (for example, the identical learning face image of the identical person) are linked to each other. Then, when using the second dictionary 24, the normalized patterns of the learning target feature points linked with the first dictionary 18 are used. More specifically, the similarity is obtained between the normalized patterns of the first dictionary 18 used for calculating the estimated coordinates of the target feature point and the subspaces of the normalized patterns of the learning target feature points linked thereto.

(2-7) Step 7

In Step 7, the determination unit 28 determines the position of the target feature point from the similarity obtained by the first pattern matching unit 20, the similarity obtained by the second pattern matching unit 26 and the score calculated on the basis of the priori probability obtained from the learning data in advance. The priori probability will be described later.

The score calculated on the basis of the priori probability is obtained by performing a predetermined arithmetic operation on the appearance probability of the learning data which belongs to the class in which the similarity is calculated at the relative position. For example, in order to achieve a balance with other scores, it is multiplies by a constant, or a log is calculated.

The sum of the similarity obtained by the first pattern matching unit 20, the similarity obtained by the second pattern matching unit 26 and the score calculated on the basis of the priori probability is determined as the score, and the candidate having the highest score from among all the candidates is determined as the target feature point to be obtained.

(3) First Dictionary 18, Second Dictionary 24

Figure 6:
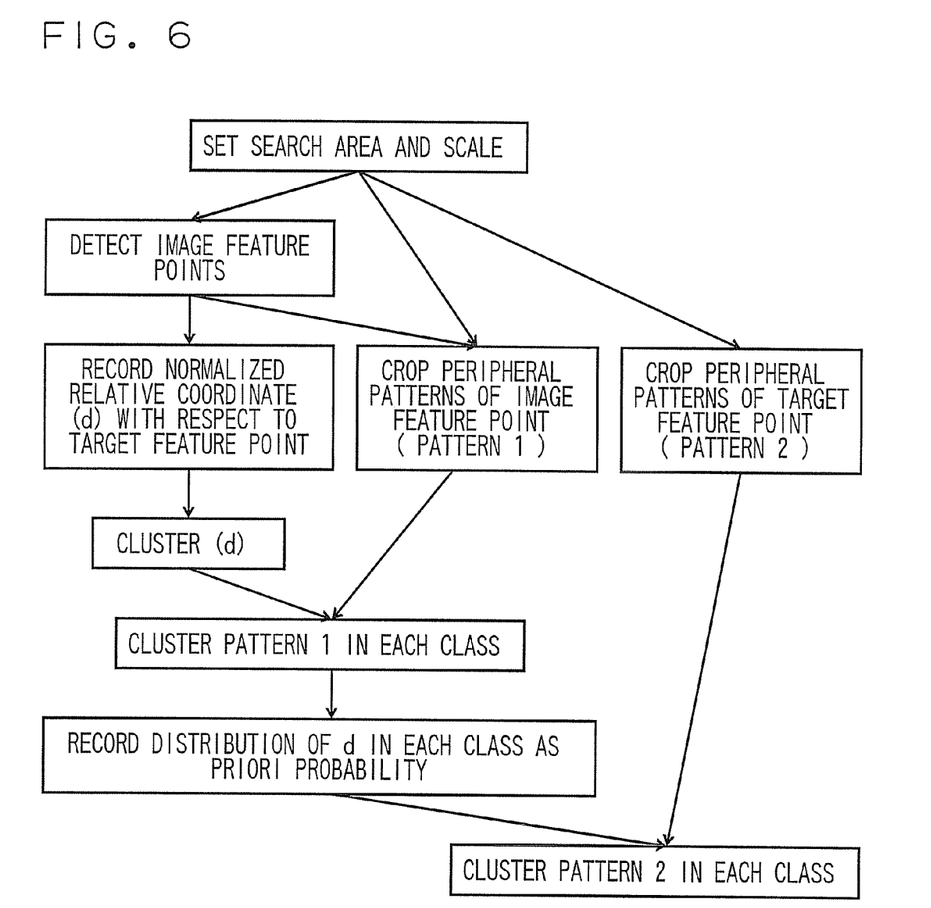
FIG. 6 is a flowchart showing an operation at the time of learning according to the first embodiment.

Referring now to FIG. 6, the operation of the first dictionary 18 and the second dictionary 24 at the time of learning will be described.

(3-1) First Dictionary 18

The learning image feature points are detected from the learning data obtained from the learning face image whose positions of the learning target feature points are known in advance in the same manner as the operation for detection. The normalized coordinate vectors d with respect to the learning target feature points at the time of the detection are also recorded.

Subsequently, clustering is performed for dividing the vector d into several classes. For example, the normalized coordinate is divided into the grid-like pattern, and the clustering is performed with reference to the positions (coordinates).

The normalized patterns are cropped at the positions of the respective learning image feature points. The method of normalization is the same as the method described in conjunction with FIG. 4 at the time of detection. In other words, the peripheral patterns of the learning image feature points are cropped, and the peripheral patterns are normalized with the scale described above.

The first dictionary 18 is prepared from the normalized patterns corresponding to the respective classes (positions) of the vector d.

The first dictionary 18, being a dictionary to be used in the subspace method, is prepared by analyzing a main component with the normalized patterns as the feature vector. Statistic information of the respective classes (positions), such as an average coordinate and the dispersion thereof, obtained from the distributions of the vectors d which belong to the respective classes (positions) is recorded as the relative positions.

Then, the clustering is further applied on the respective classes (positions) with reference to the normalized patterns. The ratios of the normalized patterns which belong to the classes (positions) obtained by this clustering with respect to the normalized patterns which belong to the same classes (positions) before this clustering are stored as the priori probabilities.

In this manner, the dictionary is further downsized through the two-step clustering of the positions and the patterns.

(3-2) Second Dictionary 24

The peripheral patterns are cropped at the positions of the learning target feature points in the learning face image with the positions of the learning target feature points as the centers, and then are normalized to prepare the normalized patterns. The second dictionary 24 is prepared corresponding to the respective classes of the first dictionary 18. The second dictionary 24 stores subspaces of the normalized patterns of the learning target feature points, which are associated with the first dictionary 18. In other words, the respective normalized patterns of the respective classes in the first dictionary 18 and the normalized patterns of the learning target feature points which are cropped from the identical image (for example, the identical learning face image of the identical person) are linked to each other. Then, when using the second dictionary 24, the normalized patterns of the learning target feature points linked with the first dictionary 18 are used.

Simultaneously, the clustering of the patterns of the learning target feature points is also performed as needed. The clustering of the pattern is performed by k-means method.

(4) Advantages

In this manner, according to the face feature point detection apparatus 10 in the first embodiment, the face feature point is detected satisfactorily even in a case in which the face feature point has less image feature such as the tip of the nose and hence candidates of the feature point are not detected absolutely in the vicinity thereof.

Second Embodiment

Figure 7:
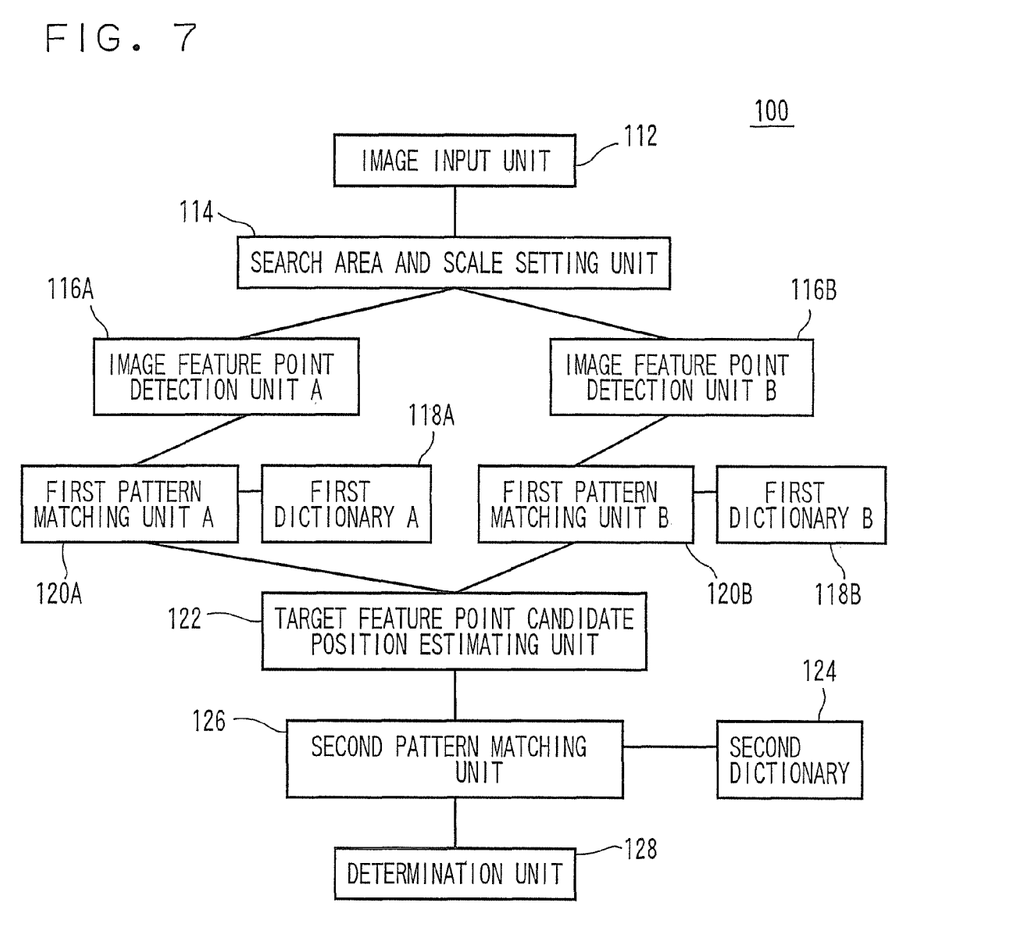
FIG. 7 is a block diagram sowing a configuration of a face feature point detection apparatus 100 according to a second embodiment of the invention.

Referring now to FIG. 7, a face feature point detection apparatus 100 according to a second embodiment of the invention will be described.

(1) Configuration of Face Feature Point Detection Apparatus 100

FIG. 7 is a block diagram showing the face feature point detection apparatus 100 according to the second embodiment.

The face feature point detection apparatus 100 according to the second embodiment includes an image input unit 112 for entering an image to be processed, a search area and scale setting unit 114 for setting a search area and a scale, an image feature point detection unit 116A for detecting image feature points selected from local image information of respective points, an image feature point detection unit 116B for detecting image feature points different from the image feature point detection unit 116A, a first dictionary 118A and a first dictionary 118B including coordinates of relative positions between the image feature points and a target feature point associated with peripheral patterns of the image feature points stored therein, first pattern matching units 120A and 120B for matching the first dictionaries 118A and 118B and the peripheral patterns of the image feature points, a target feature point candidate position estimating unit 122 for estimating candidates of the position of the target feature point, a second dictionary 124, a second pattern matching unit 126 for matching the second dictionary 124 and the peripheral pattern of the target feature point, and a determination unit 128 for obtaining the position of the target feature point.

(2) Operation of Face Feature Point Detection Apparatus 100

Referring now to FIG. 7, the operation of the face feature point detection apparatus 100 according to the second embodiment will be described. In the second embodiment, the description is focused on a case of finding the tip of the nose as a target feature point with two points of eyes as reference feature points by detecting firstly reference feature points and setting a search area and a scale using the detected positions of the eyes as in the first embodiment.

The image input unit 112, the search area and scale setting unit 114, the second dictionary 124, the second pattern matching unit 126 and the determination unit 128 are the same as those in the first embodiment.

The image feature point detection units 116A and 116B detect the image feature points in the methods different from each other.

In the second embodiment, the circular separability filter used in the first embodiment and corner detection disclosed in a literature "C. J. Harris and M. Stephens. A combined corner and edge detector. Proc. 4th Alvey Vision Conferences, pages 147-151, 1988" are employed.

Candidates of the image feature point obtained by the respective image feature point detection units 116A and 116B are matched by the first pattern matching units 120A and 120B using the first dictionaries 118A and 118B prepared by the corresponding learning data.

The processing in this example is the same as that in the first embodiment except for the first dictionaries 118A and 118B.

Modification

The invention is not limited to the embodiments shown above, and various modifications may be made without departing from the scope of the invention.

In other words, the invention is not directly limited to the embodiments shown above, and the components may be modified and embodied in the stage of implementation without departing the scope of the invention. Various modes of the invention may be achieved by combining the plurality of components disclosed in the embodiments shown above appropriately. For example, some components may be removed from all the components shown in the embodiments. In addition, the components from different embodiments may be combined as needed.

(1) Modification 1

The search area and the scale are set using the positions of the eye as the reference feature point in the embodiments shown above. However, the invention is not limited thereto.

For example, there is a method in which a face area is detected in a square shape, and the position and the size are used as a reference feature point.

The method of setting the search area and the scale is not limited to those described in the embodiments shown above.

(2) Modification 2

The case of detecting the tip of the nose as the target feature point is described in the embodiments shown above. However, the invention is not limited thereto.

For example, any points may be used as long as they are definable feature points.

(3) Modification 3

A grayscale pattern is used as the feature used on the pattern matching in the embodiments shown above. However, the invention is not limited thereto.

For example, those applied with histogram equalization, those converted by an edge detection filter, and those applied with processing of frequency area such as Fourier transformation, as long as it is the feature generated from the image.

(4) Modification 4

The method of normalizing the pattern in the embodiments shown above employs the equidistance in the vertical and horizontal directions from the position of image (target) feature point as the center. However, it is not limited thereto.

For example, the position of the center does not have to be the same position as the position of the feature point, and the range may be varied in the vertical and horizontal directions.

(5) Modification 5

The relative position corresponding to the classes in which the similarity with respect to the first dictionaries 118 exceeds the predetermined threshold value is employed for estimating positions in the target feature point candidate position estimating unit 122 in the embodiments shown above. However, the invention is not limited thereto.

For example, a method in which a predetermined number of classes are selected in the descending order from the top in similarity, and an average value thereof is used is also applicable.

(6) Modification 6

The candidate having the highest score is selected in the determination unit 128 in the embodiments shown above. However, the invention is not limited thereto.

For example, a method in which the scores of the plurality of candidates are determined through a comprehensive evaluation is also applicable. For example, a method in which an average in position or a weighted average is obtained from the candidates whose values of the score exceed the predetermined threshold value is also applicable.

(7) Modification 7

The method in which the coordinate is divided into the grid-like pattern and the k-means method are used as the clustering method in the embodiments shown above. However, the invention is not limited thereto.

For example, any methods are applicable as long as multidimensional data such as the coordinate value or the pattern is discretized.

(8) Modification 8

The clustering of the coordinate of the position of the image feature point and the clustering of the normalized image pattern are performed when preparing the dictionaries in the embodiments shown above. However, the invention is not limited thereto.

For example, the clustering on the basis of the orientation of the face may be added.

What is claimed is:

1. A face feature point detection apparatus comprising:
   an image input unit configured to enter an image including a face;
   a search area setting unit configured to set a search area for detecting a target feature point from the image;
   an image feature point detection unit configured to detect image feature points from the search area of the image;
   a first dictionary storage unit configured to store a first dictionary including information relating to peripheral patterns of learning image feature points obtained from a plurality of learning face images and coordinates of relative positions between the respective learning image feature points and learning target feature points associated with respect to each other;
   a first pattern matching unit configured to select the peripheral patterns of the learning image feature points which are similar to peripheral patterns of the image feature points from the peripheral patterns of a plurality of the learning image feature points in the first dictionary;
   a target feature point candidate position estimating unit configured to extract coordinates of the relative positions of the learning target feature points corresponding to the selected learning image feature points;
   a target feature point peripheral pattern detection unit configured to crop a peripheral pattern of the target feature point from the face image on the basis of the extracted coordinates of the relative positions;
   a second dictionary storage unit configured to store a second dictionary including information relating to peripheral patterns of the learning target feature points obtained from the plurality of learning face images;
   a second pattern matching unit configured to select the peripheral patterns of the learning target feature points similar to the peripheral pattern of the target feature point from the peripheral patterns of the plurality of learning target feature points in the second dictionary; and
   a determination unit configured to obtain the position of the target feature point from the similarity between the peripheral pattern of the image feature point and the peripheral patterns of the selected learning image feature points and the similarity between the peripheral pattern of the target feature point and the peripheral patterns of the selected learning target feature points,
   wherein the first dictionary includes a plurality of classes,
   wherein the classes each include classes classified by a first clustering on the basis of the relative coordinate and classes classified by a second clustering on the basis of the similarity of the peripheral patterns of the learning image feature points, and
   wherein a subspace generated on the basis of the feature extracted from the peripheral patterns of the learning image feature points in the respective classes is stored in each class.

2. The apparatus according to claim 1, wherein the determination unit obtains total scores for the learning image feature points each from the sum of a first score calculated from the similarity between the peripheral pattern of the image feature point and the peripheral pattern of the selected learning image feature point, a second score calculated from the similarity between the peripheral pattern of the target feature point and the peripheral pattern of the selected learning target feature point, and a third score on the basis of the priori probability, and determines the coordinate of the relative position of the learning target feature point corresponding to the learning image feature point having the highest total score from among the total scores as the position of the target feature point.

3. The apparatus according to claim 1, wherein the first dictionary stores representative patterns generated from the peripheral patterns of the plurality of learning image feature points or subspaces in association with statistic values indicating distribution of the relative coordinates.

4. The apparatus according to claim 1, wherein the information relating the learning target feature points stored in the second dictionary is extracted from the learning face image from which the information relating the learning target feature point is extracted and is associated with the peripheral pattern of the learning image feature stored in the first dictionary, and
   wherein the second pattern matching unit obtains the similarity between the peripheral pattern of the target feature point and the peripheral pattern of the learning target feature point associated with the peripheral pattern of the target feature point.

5. The apparatus according to claim 1 comprising two types of the first dictionaries,
   wherein the respective first dictionaries include the plurality of learning image feature points using different image feature point detecting methods.

6. A face image feature point detecting method comprising;
   entering an image including a face;
   setting a search area for detecting a target feature point from the image;
   detecting image feature points from the search area of the image;
   storing in advance a first dictionary including information relating peripheral patterns of learning image feature points obtained from a plurality of learning face images and coordinates of relative positions between the respective learning image feature points and learning target feature points associated with respect to each other;
   selecting the peripheral pattern of the learning image feature point which is similar to a peripheral pattern of the image feature point from the peripheral patterns of a plurality of the learning image feature points in the first dictionary;
   extracting a coordinate of the relative position of the learning target feature point corresponding to the selected learning image feature point;

cropping a peripheral pattern of the target feature point from the face image on the basis of the extracted coordinate of the relative position;

storing in advance a second dictionary including information relating a peripheral pattern of the learning target feature point obtained from the plurality of learning face images;

selecting the peripheral pattern of the learning target feature point similar to the peripheral pattern of the target feature point from the peripheral patterns of the plurality of learning target feature points in the second dictionary; and obtaining the position of the target feature point from the similarity between the peripheral pattern of the image feature point and the peripheral pattern of the selected learning image feature point and the similarity between the peripheral pattern of the target feature point and the peripheral pattern of the selected learning target feature point, wherein the first dictionary includes a plurality of classes, wherein the classes each include classes classified by a first clustering on the basis of the relative coordinate and classes classified by a second clustering on the basis of the similarity of the peripheral patterns of the learning image feature points, and wherein a subspace generated on the basis of the feature extracted from the peripheral patterns of the learning image feature points in the respective classes is stored in each class.

7. A program stored in a non-transitory computer readable medium, the program comprising functions of;

entering an image including a face;

setting a search area for detecting a target feature point from the image;

detecting image feature points from the search area of the image;

storing in advance a first dictionary including information relating peripheral patterns of learning image feature points obtained from a plurality of learning face images and coordinates of relative positions between the respective learning image feature points and learning target feature points associated with respect to each other;

selecting the peripheral pattern of the learning image feature point which is similar to a peripheral pattern of the image feature point from the peripheral patterns of a plurality of the learning image feature points in the first dictionary;

extracting a coordinate of the relative position of the learning target feature point corresponding to the selected learning image feature point;

cropping a peripheral pattern of the target feature point from the face image on the basis of the extracted coordinate of the relative position;

storing in advance a second dictionary including information relating a peripheral pattern of the learning target feature point obtained from the plurality of learning face images;

selecting the peripheral pattern of the learning target feature point similar to the peripheral pattern of the target feature point from the peripheral patterns of the plurality of learning target feature points in the second dictionary; and obtaining the position of the target feature point from the similarity between the peripheral pattern of the image feature point and the peripheral pattern of the selected learning image feature point and the similarity between the peripheral pattern of the target feature point and the peripheral pattern of the selected learning target feature point, wherein the first dictionary includes a plurality of classes, wherein the classes each include classes classified by a first clustering on the basis of the relative coordinate and classes classified by a second clustering on the basis of the similarity of the peripheral patterns of the learning image feature points, and wherein a subspace generated on the basis of the feature extracted from the peripheral patterns of the learning image feature points in the respective classes is stored in each class.

* * * * *